United States Patent [19]

Wickline

[11] Patent Number: 5,448,291
[45] Date of Patent: Sep. 5, 1995

[54] LIVE VIDEO THEATER AND METHOD OF PRESENTING THE SAME UTILIZING MULTIPLE CAMERAS AND MONITORS

[76] Inventor: Dennis E. Wickline, 26311 Ursuline, St. Clair Shores, Mich. 48081

[21] Appl. No.: 84,023

[22] Filed: Jun. 30, 1993

[51] Int. Cl.⁶ .............................................. H04N 7/18
[52] U.S. Cl. ...................................... 348/159; 348/38
[58] Field of Search ...................... 358/93, 87, 88, 108, 358/181, 183, 22, 185; 348/38, 77, 143, 159; H04N 7/18

[56] References Cited

U.S. PATENT DOCUMENTS

| | | | |
|---|---|---|---|
| 1,792,259 | 2/1931 | Tolson | 348/516 |
| 2,792,612 | 7/1957 | Holmes | |
| 2,943,141 | 6/1960 | Knight | 358/108 |
| 3,035,836 | 5/1962 | McCulley | |
| 3,217,098 | 8/1962 | Oswald | 358/181 |
| 3,492,419 | 1/1970 | Bartonik | 348/38 |
| 3,602,498 | 8/1971 | Wilson et al. | |
| 4,805,895 | 2/1989 | Rogers | |
| 4,962,420 | 10/1990 | Judenich | |
| 5,313,276 | 5/1994 | Taaffe | 348/51 |

Primary Examiner—Howard W. Britton

[57] ABSTRACT

A video theater to present live theatrical productions, having a thrust stage with a ceiling and a stage which is equipped with at least two video cameras having a full view of the field of action and two video monitors which can be seen by an audience. Each camera is electronically connected to a monitor opposite it so that it transmit a video image of the action in a play from its vantage point, to be viewed by an audience from another vantage point. Each camera and monitor is suspended from the ceiling of the thrust stage such that one camera is positioned on opposite side of the thrust stage and each monitor is positioned on opposite sides of the thrust stage.

10 Claims, 2 Drawing Sheets

LIVE VIDEO THEATER AND METHOD OF PRESENTING THE SAME UTILIZING MULTIPLE CAMERAS AND MONITORS

BACKGROUND OF THE INVENTION

1. Field of the Invention

The present invention relates to a novel video theater to present live, theatrical productions on a thrust stage, and a method of presenting the same.

The present invention further relates to an intimate theatrical presentation using multiple live video images to enhance and compliment the impact of the theatrical presentation by allowing the audience to view the action on the stage from several different perspectives at the same time.

2. Description of the Related Art

Holmes U.S. Pat. No. 2,797,612 discloses an intermittent motion picture film feed apparatus to produce a live television picture which will have no flicker or extraneous disturbing effects even though the film projector is operating non-synchronously with the television system.

McCulley, U.S. Pat. No. 3,035,836 discloses a means of staging theatrical productions which involves integrating live and filmed action on a stage wherein a translucent image receiving medium is positioned intermediate the front and rear boundaries of the stage and a projector is positioned in back of the medium for projecting a moving scene on the medium which is visually accessible to an audience in front of the stage.

Wilson U.S. Pat. No. 3,602,498 discloses magical illusionary effects combining live and filmed action by the method steps of filming a live action scene including items such as objects or persons while moving one of the items to a predetermined area in the scene where it is blocked from view by an opaque mask. Thereafter, when projecting the filmed action on a screen, a supposedly empty container is held by a live person in front of the screen at the time and place in the projecting sequence when and where the designated item was blocked from view, thereby making it appear that the item in the projected film was transferred to the empty container. Viewers are then surprised when the designated item is withdrawn from the supposedly empty container.

Procopio, U.S. Pat. No. 4,001,946 discloses a training device and game for simulating the production os a television show. The device includes miniature components in the form of and simulating components employed in the production of the television show. The device features the employment of a miniaturized video tape recorder, a monitor, cameras and camera switches, and objects to be televised.

Rogers, U.S. Pat. No. 4,805,895 discloses a theatrical imaging system for forming images where there are no image forming surfaces. The system includes a theater having a rakes audience viewing in spaced apart relationship to the stage. A false ceiling separates a motion picture projector and rear view projection screen, from the audience viewing area. The screen is disposed above and in front of the audience and provides a real image forming surface. A semi-transmissive reflecting member disposed at an angle of 13.5 to 31 degrees to a vertical plane disposed normal to the average sight line of the audience member is disposed in facing relationship to the screen to generate a virtual image on the stage in the line of sight of the audience.

Jundenichf U.S. Pat. No. 4,962,420 discloses a video information system which includes a screen having at lest two cells rotatable in at least one direction and forming a three dimensional multi-plane screen system changeable in space. Information from at least one projector is fed to two or more cells. Video information is presented in an in-depth three dimensionally unfolding space. The system also has the capability of producing simultaneous changes in time, and the screen system can be efficiently combined with scenery attributes. The video information can be fed to the cells of the screen in the form of front or rear projection.

None of the cited art, either alone or in combination, disclose or suggest the video live theater concept of the present application. None of the art cited uses the arrangement of video cameras and monitors to enhance the expression of emotions and action and allow an audience to view a theatrical production from a plurality of viewing perspectives at the same time.

SUMMARY OF THE INVENTION

The present invention is directed to a live video theater and method of presenting the same. The live video theater is adaptable to present live, theatrical and entertainment productions and comprises a thrust stage having a ceiling and a stage. The thrust stage is equipped with at least two video cameras each having a field of view of at least a portion of the stage, and at least two video monitors, each oriented on a side of the stage opposite to the camera electronically connected to it. The monitors are oriented such that they can be viewed by an audience. As previously stated, each monitor is oriented opposite the camera electronically connected to it so that the audience may view the actors on the stage from one perspective, and, by reference to a monitor, view the actors on the stage from a different perspective. Preferably, the audience is seated in a ¾ round configuration about the stage.

It is further contemplated that a plurality of cameras and monitors can be used to enhance the different perspectives to be present to the audience via the monitors.

DETAILED DESCRIPTION OF THE PREFERRED EMBODIMENT

Figure 1:
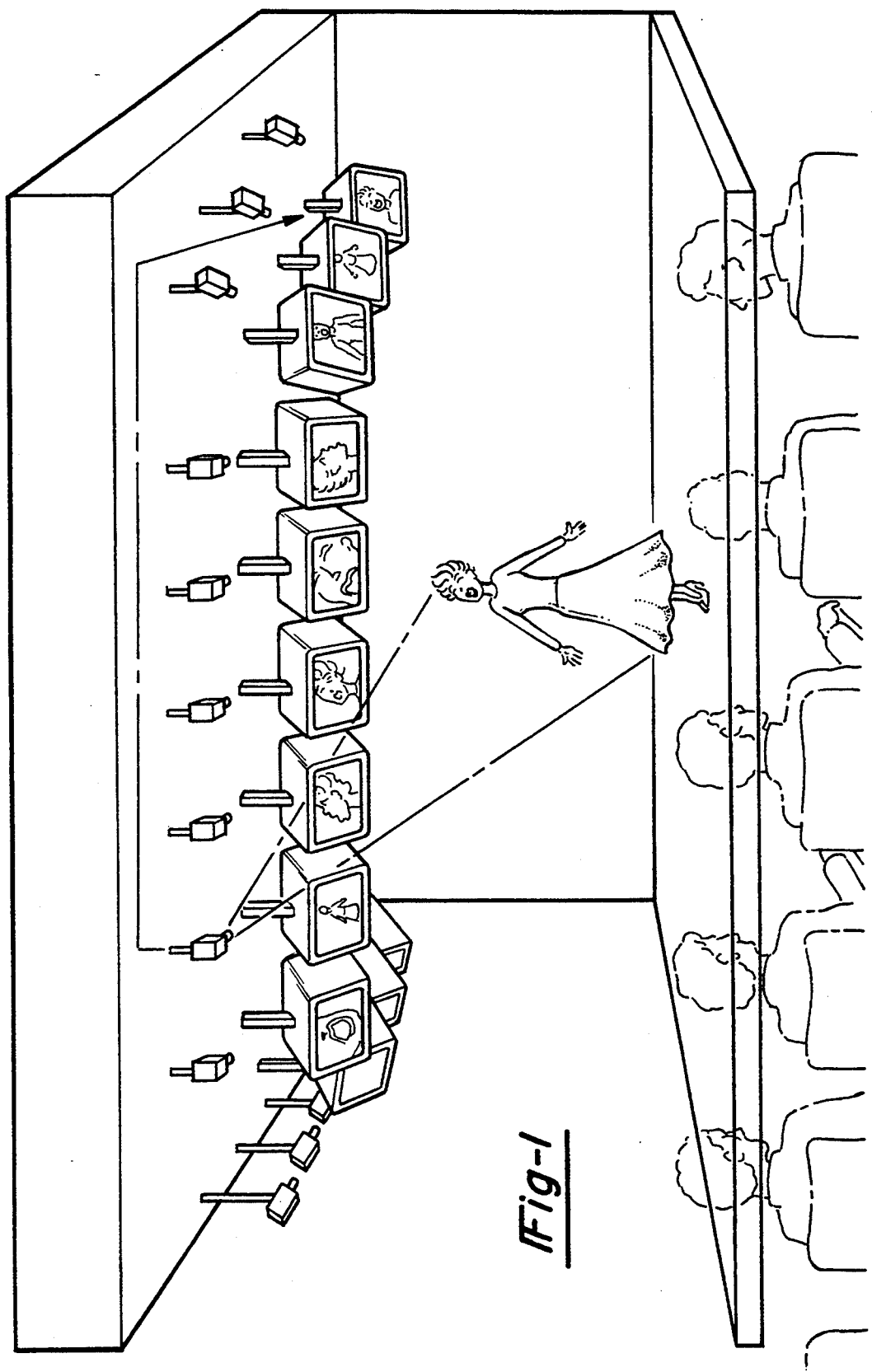
FIG.1 is a perspective view of the thrust stage of the present invention.

Turning now to the drawings wherein like number depict like structures, thrust stage 10 has ceiling 12 and stage 14. Audience 16 is seated in a ¾ round configuration about the stage. Video cameras C-1 through C-8 are oriented around the periphery of the stage, and are preferably suspended from the ceiling 12. The cameras are electronically connected to the monitors, designated as M-1 through M-8. Those skilled in the art recognize that any number of cameras and monitors could be used, the only constraint being that each camera must have at least one monitor, and vice versa, and further that at least two cameras and, correspondingly, two monitors be used.

Preferably, the thrust stage is rectangular and the audience is oriented opposite its long dimension 21, and it is preferred that four cameras are positioned along the length 14 dimension of the state and two along each width sides 16 and 18 of the stage.

Figure 2:
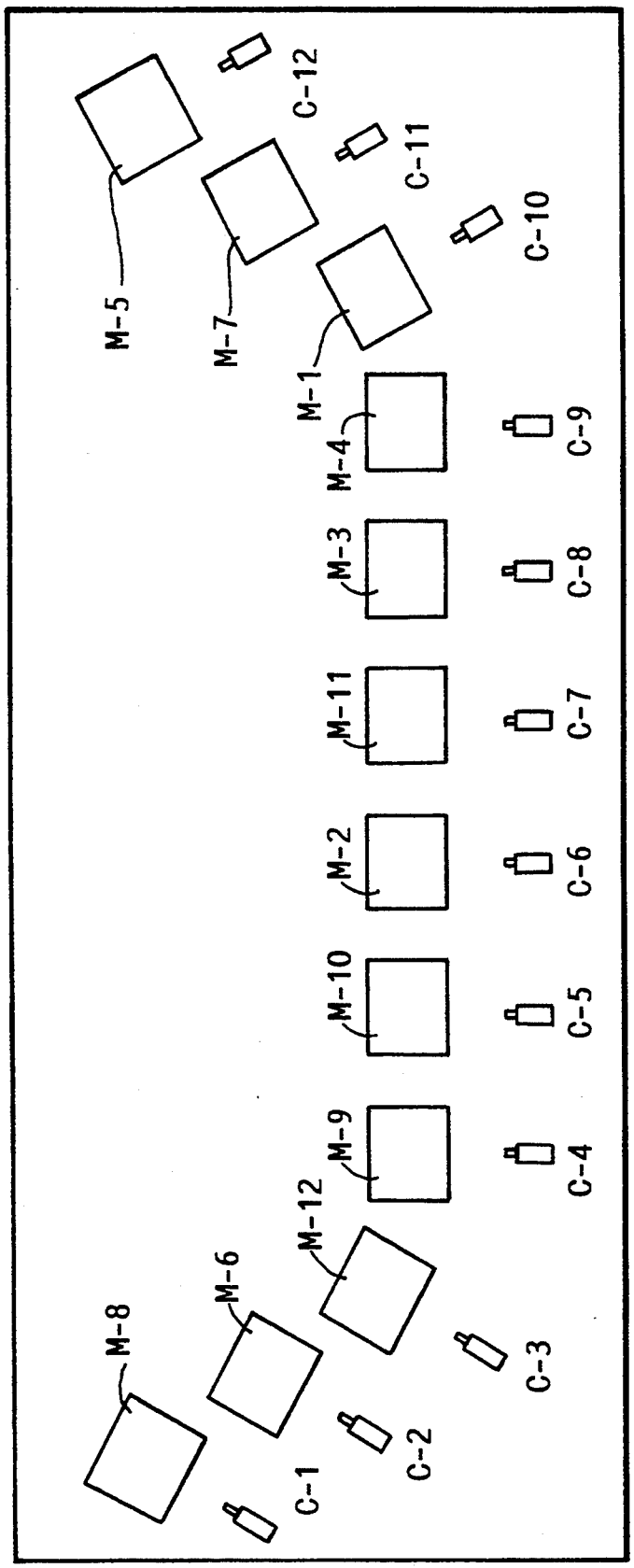
FIG. 2 is a diagrammatic representation of the thrust stage of the present invention showing the orientation and relationship of the cameras to the monitors.

Turning now to FIG. 2, it can be seen that each monitor is electronically connected to a camera such that a camera may transmit and image to a monitor. The arrangement of monitors and cameras is important, with a camera on opposite sides of the stage from the monitor to which it is connected. Preferably, the cameras and monitors should be diagonally opposite to each other for maximum effect. Thus, it can be seen that C-1 is electronically connected to M-1, and C-2 is electronically connected to M-2, and C-3 is electronically connected to M-3, and C-4 is electronically connected to M-4, and C-5 is electronically connected to M-5, and C-6 is electronically connected to M-6, and C-7 is electronically connected to M-7 and C-8 is electronically connected to M-8. Although eight cameras and monitors are shown, it is to be understood by those of ordinary skill in the art that more than eight cameras and monitors could be used without departing from the scope and spirit of this invention.

Turning now to FIG. 1 and 2, it can now be seen that when actor 20 is in one location of the stage, a camera is present which has at least a portion of the stage in its field of view. The audience can then view the actor from its perspective, and by means of coordinated movements and blocking, the emotional response of the actor to a scene in the live scripted theatrical production may be seen on the monitor from a new and different perspective to the audience. Indeed, it is contemplated that a different background could be transmitted to the monitor and only the image of the actor superimposed on the new background so that the audience is exposed to artistic interpretations of the moods and emotions the actors express on the stage. If different scenery is shown on the monitor from that on the stage, it can be understood that the actors could be seen in different locations than the other actors not seen on the monitors. In addition, since each monitor is connected to a different camera, many different perspectives, sceneries and emotional acts of all actors on the stage can be viewed from many different perspectives.

It is contemplated that this invention can be used in a wide range of theatrical forums, including Proscenium Theater, and those skilled in the art will recognize that by varying the number of cameras and monitors and by altering the arrangements of the cameras and monitors, one can adapt this invention to many different theatrical settings without departing from the scope and spirit of the invention.

I claim:

1. A video theater to present live theatrical productions, comprising:
a thrust stage having a ceiling and a stage, said thrust stage further equipped with at least two video cameras having a field of view of at least a portion of said thrust stage; and at least two video monitors; each one of said cameras electronically connected to a different monitor such that each camera transmits images to a different monitor; said cameras and monitors oriented such that each camera is in opposing relationship to the monitor to which it is electronically connected; said monitors further oriented to be viewed by an audience; each said camera and monitor suspended from said ceiling; each said camera and each said monitor located at opposite sides of said thrust stage from each other; said audience being positioned in a ¾ round configuration so that the audience may view the theatrical production on stage from a direct perspective, and by looking at the monitors, view the theatrical production from a plurality of perspectives via the monitors.

2. The video theater of claim 1, wherein thrust stage is rectangular with the audience set in front of the long dimension of the rectangle having width and length.

3. The video theater of claim 2, wherein a plurality of cameras and monitors are suspended from the ceiling.

4. The video theater of claim 3, wherein eight camera and monitors are used, with four cameras and monitors positioned along one length side of the rectangular stage and two cameras and monitors positioned along each width side of the rectangle.

5. The video theater of claim 4, wherein there are eight cameras and eight monitors, arranged around the periphery of said thrust stage; said cameras designated as C-1, C-2, C-3, C-4, C-5, C-6, C-7, and C-8, and said monitors designated as M-1, M-2, M-3, M-4, M-5, M-6, M-7 and M-8; each said camera being electronically connected to at least one said monitor; the arrangement of the monitors around the thrust stage being in the following sequential order; M-5 and M-8 are positioned along one width side of the rectangle, and M-4 and M-1 being positioned along the opposite width side of the rectangle, and, M-6, M-7, M-2 and M-3 are positioned along the long side of the rectangle proximal to the audience, and further, M-6 is proximal to M-8, and M-3 is proximal to M-1; and the cameras are arranged so that C-1 is adjacent to M-5, and C-2 is adjacent to M-8, and C-3 is adjacent to M-6, and C-4 is adjacent to M-7, and M-2 is adjacent to C-5, and M-3 is adjacent to C-6, and C-7 is adjacent to M-1 and C-8 is adjacent to M-4; and C-1 is electronically connected to M-1, and C-2 is electronically connected to M-2, and C-3 is electronically connected to M-3, and C-4 is electronically connected to M-4, and C-5 is electronically connected to M-5, and C-6 is electronically connected with M-6, and C-7 is electronically connected to M-7 and C-8 is electronically connected to M-8.

6. A method to present live, scripted theatrical productions on a thrust stage having a ceiling and a stage, said thrust stage further equipped with at least two video cameras having a field of view of at least a portion of said thrust stage; and at least two video monitors; each one of said cameras electronically connected to a different monitor such that each camera transmits images to a different monitor; said cameras and monitors oriented such that each camera is in opposing relationship to the monitor to which it is electronically connected; said monitors further oriented to be viewed by an audience; each said camera and monitor suspended from said ceiling; each said camera and each said monitor located at opposite sides of said thrust stage from each other; said audience being positioned in a ¾ round configuration so that the audience may view the theatrical production on stage from a direct perspective, and by looking at a monitor, view the theatrical production from a plurality of different perspectives via the monitors.

7. The method of claim 6, further employing a plurality of cameras and monitors.

8. The method of claim 6, wherein the thrust stage is rectangular with the audience set in front of the long dimension of the rectangle having width and length.

9. The method of claim 7, wherein eight camera and monitors are used, with four cameras and monitors positioned along one length side of the rectangular stage and two cameras and monitors positioned along each width side of the rectangle.

10. The method of claim 9, wherein there are eight cameras and eight monitors, arranged around the periphery of said thrust stage; said cameras designated as C-1, C-2, C-3, C-4, C-5, C-6, C-7, and C-8, and said monitors designated as M-1, M-2, M-3, M-4, M-5, M-6, M-7 and M-8; each said camera being electronically connected to at least one said monitor; the arrangement of the monitors around the thrust stage being in the following sequential order; M-5 and M-8 are positioned along one width side of the rectangle, and M-4 and M-1 being positioned along the opposite width side of the rectangle, and, M-6, M-7, M-2 and M-3 are positioned along the long side of the rectangle proximal to the audience, and further, M-6 is proximal to M-8, and M-3 is proximal to M-1; and the cameras are arranged so that C-1 is adjacent to M-5, and C-2 is adjacent to M-8, and C-3 is adjacent to M-6, and C-4 is adjacent to M-7, and M-2 is adjacent to C-5, and M-3 is adjacent to C-6, and C-7 is adjacent to M-1 and C-8 is adjacent to M-4; and C-1 is electronically connected to M-1, and C-2 is electronically connected to M-2, and C-3 is electronically connected to M-3, and C-4 is electronically connected to M-4, and C-5 is electronically connected to M-5, and C-6 is electronically connected with M-6, and C-7 is electronically connected to M-7 and C-8 is electronically connected to M-8.

* * * * *